April 26, 1966 J. F. DAVIS 3,247,778
COFFEE MAKERS

Filed Jan. 16, 1963 6 Sheets-Sheet 1

INVENTOR.
JAMES F. DAVIS
BY
EDWARD D. O'BRIAN
ATTORNEY

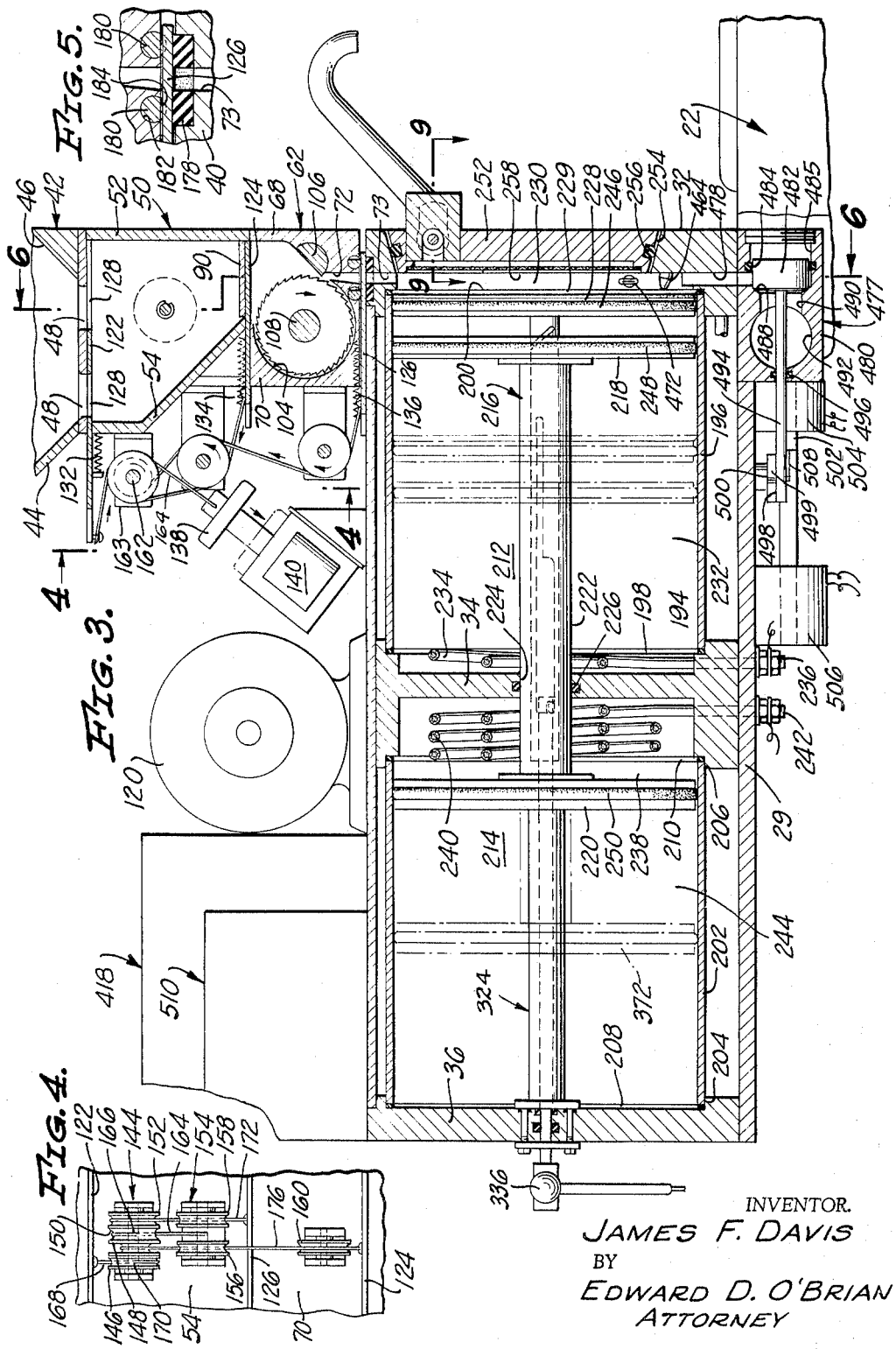

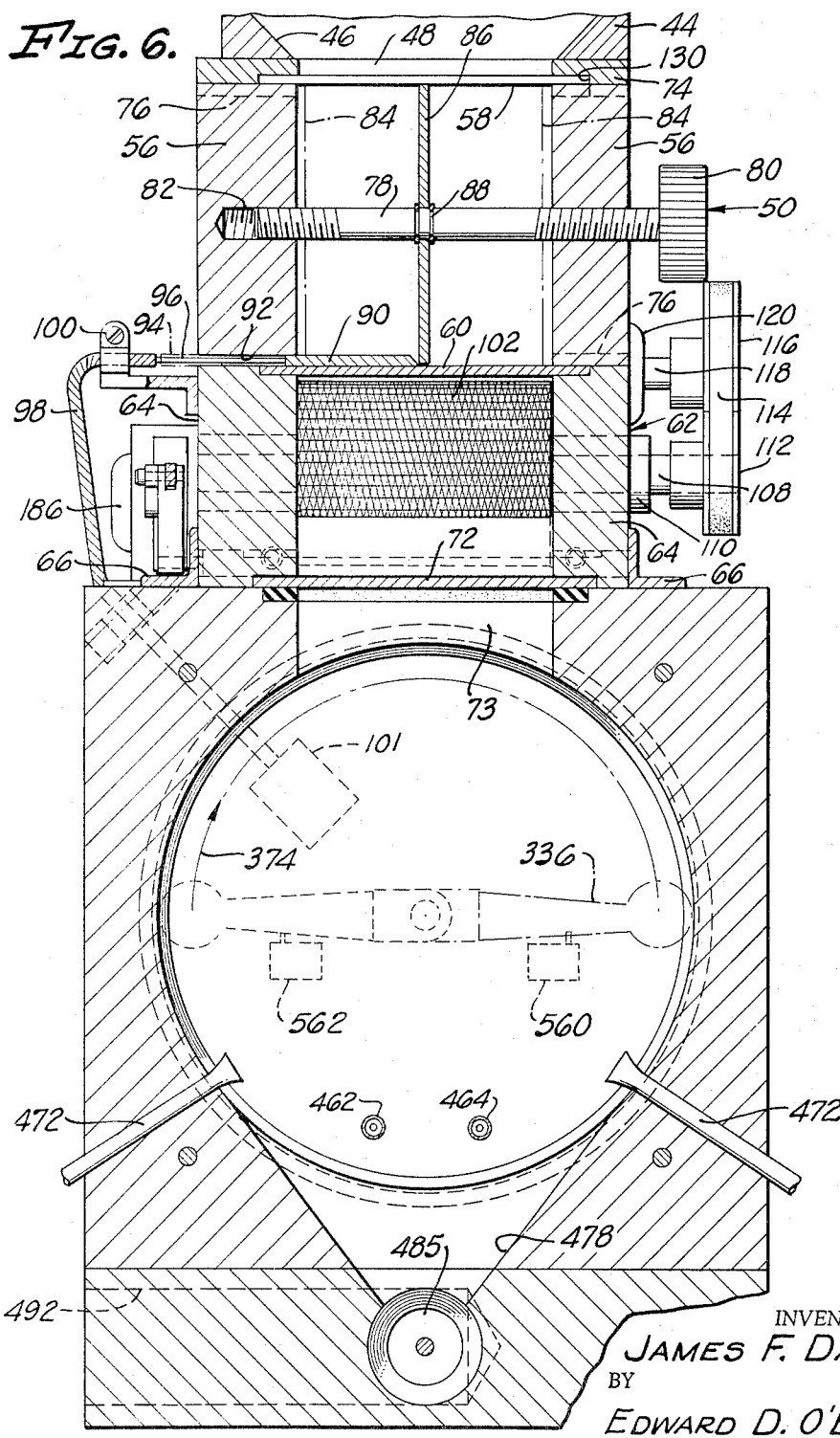

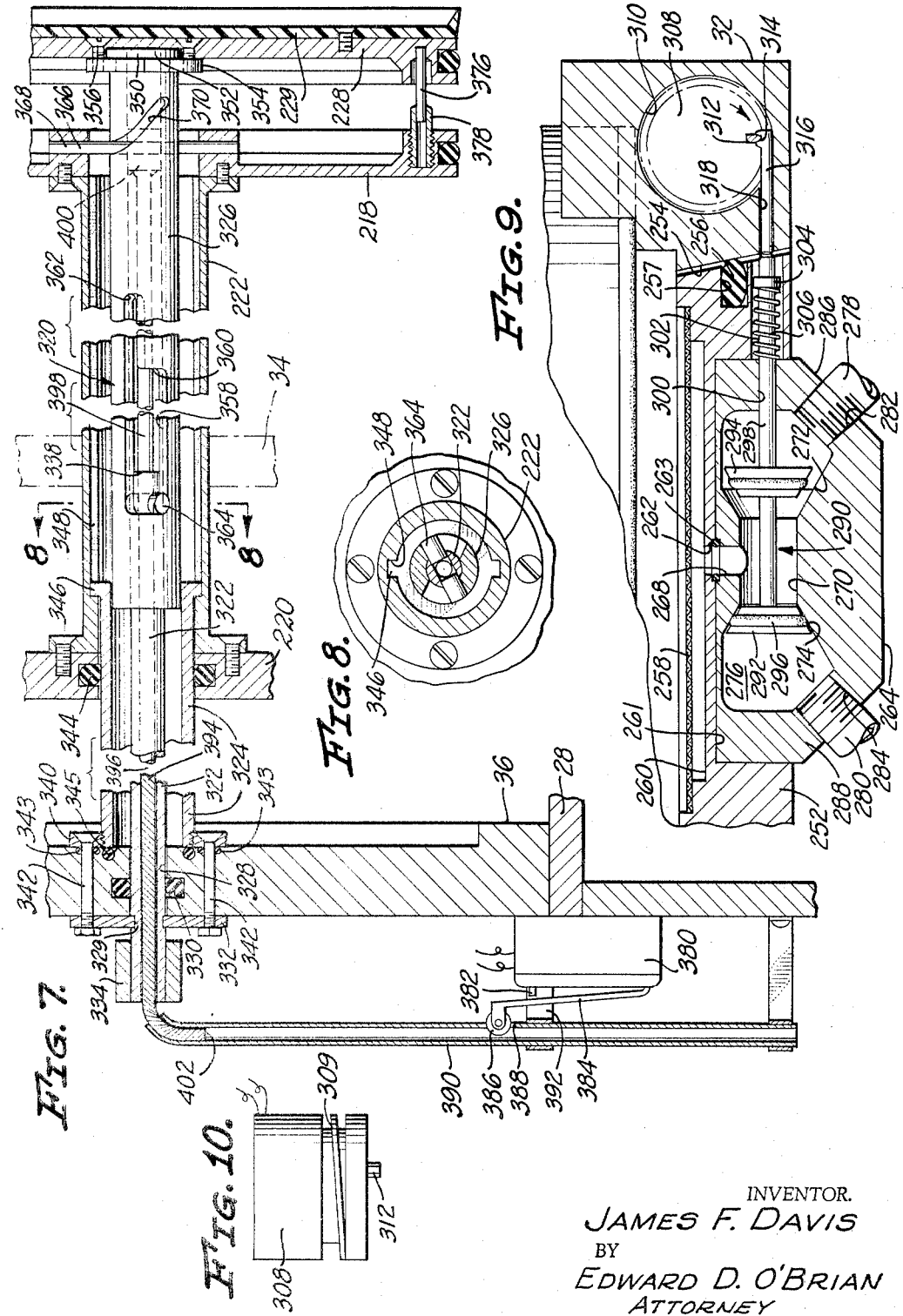

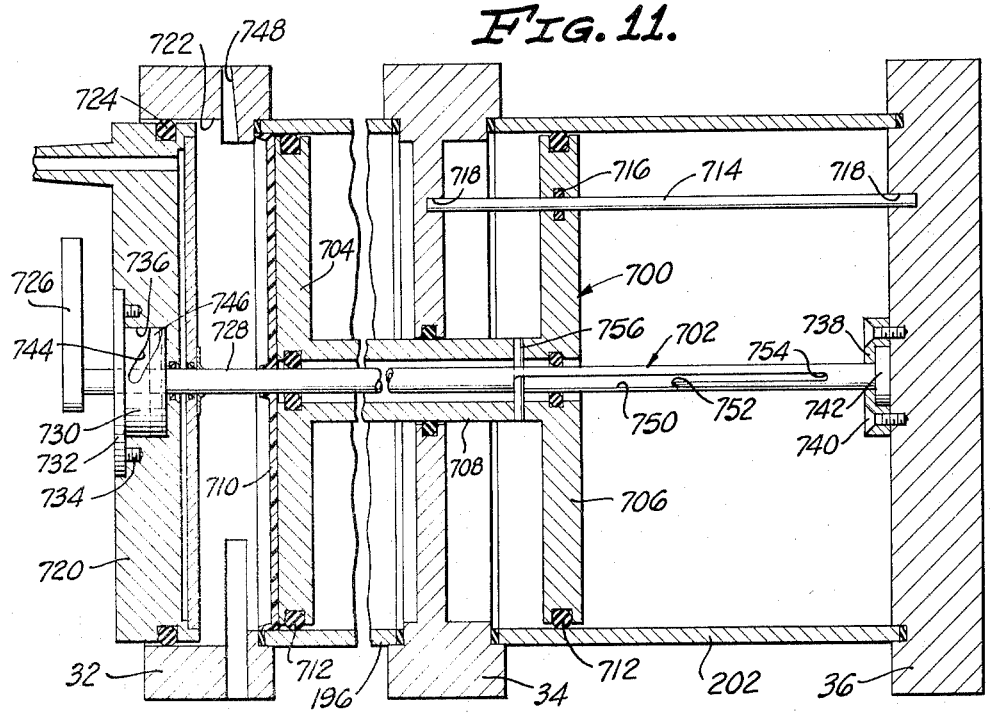
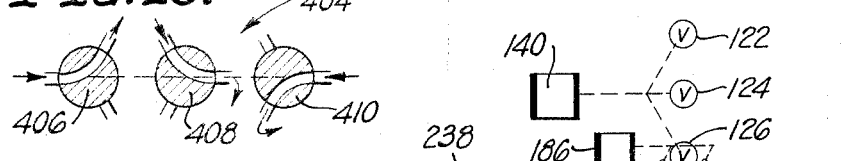
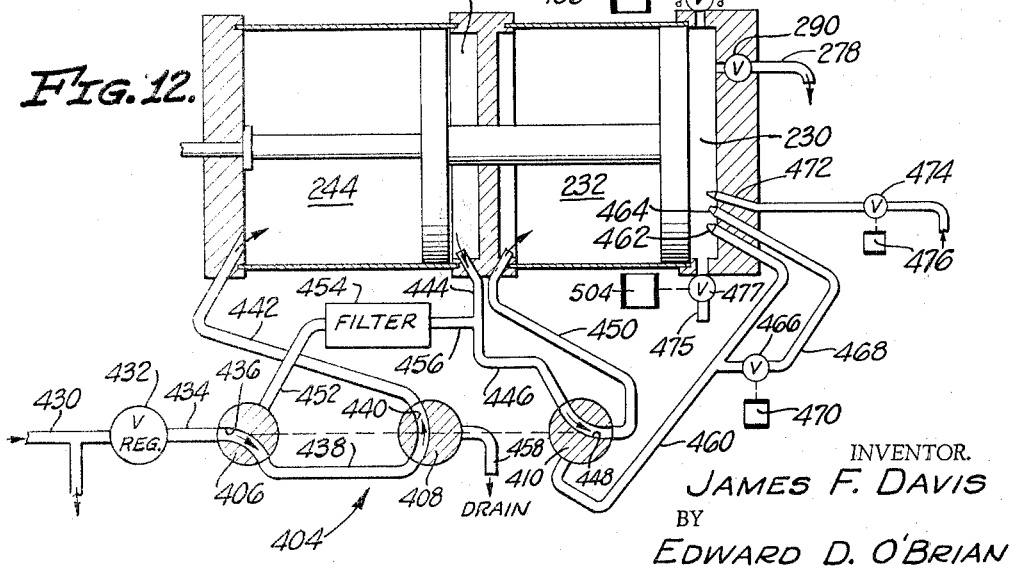
INVENTOR.
JAMES F. DAVIS
BY
EDWARD D. O'BRIAN
ATTORNEY

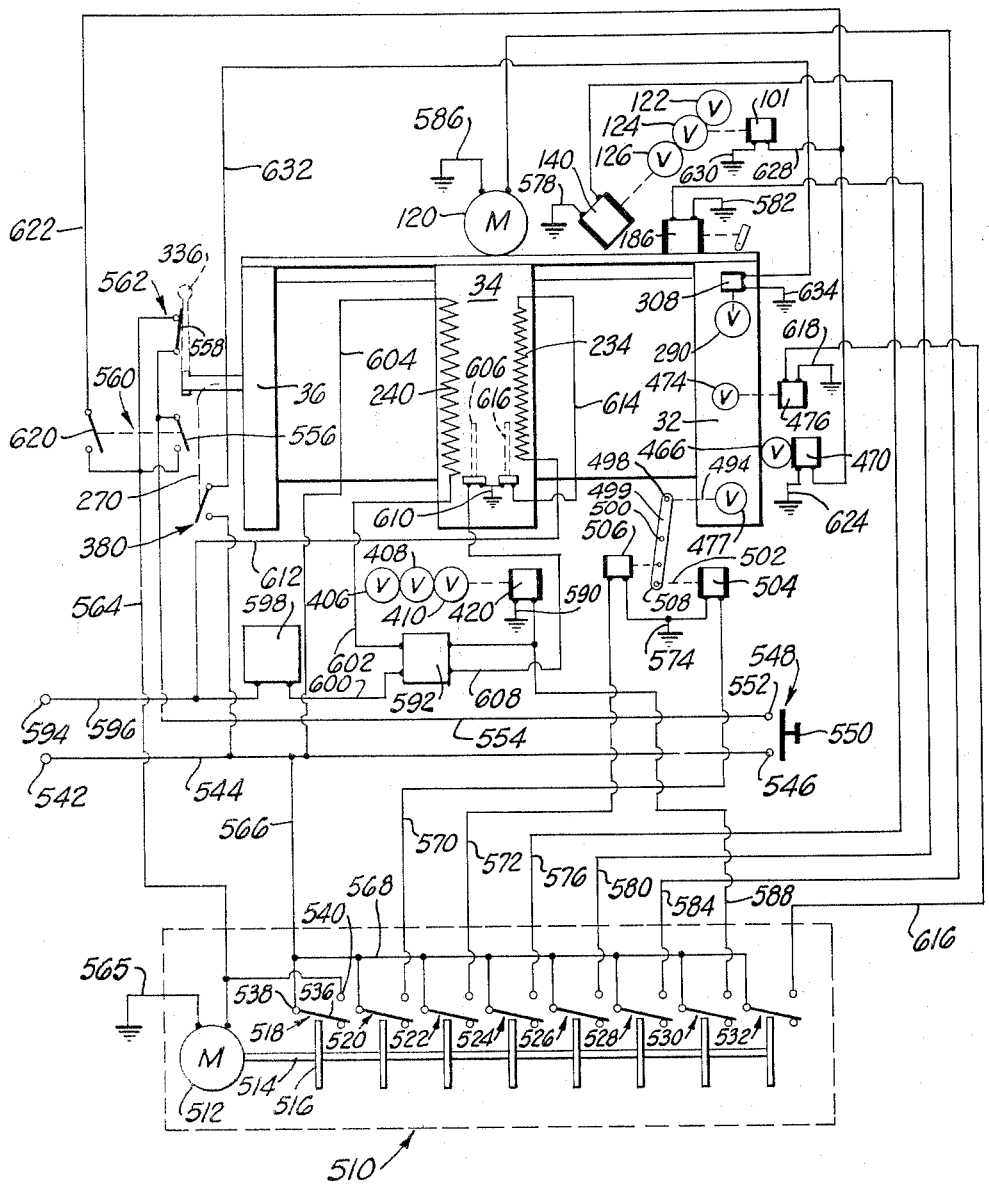

United States Patent Office 3,247,778
Patented Apr. 26, 1966

3,247,778
COFFEE MAKERS
James F. Davis, 17154 Nordhoff St., Northridge, Calif.
Filed Jan. 16, 1963, Ser. No. 251,938
21 Claims. (Cl. 99—282)

This invention pertains to new and improved coffee makers.

The term "coffee maker" is commonly employed so as to designate a machine capable of being used to produce the beverage coffee from ground, roasted coffee beans by contacting coffee bean material with water in either the aqueous or vaporous form. A number of factors determine the flavor of the beverage coffee produced in such machines. Amongst these factors are, of course, the history of the bean material, the relative quantity of bean material contacted with liquid, the duration of the contact between the bean material and the liquid and the temperature at which the infusing or decocting operation is carried out. In the United States it is commonly considered that so-called "good" coffee results normally when ground, roasted coffee beans are contacted with water at a temperature of from about 90° to 100° C. for a comparatively limited period.

In restaurants and various other related establishments there is a very definite need for coffee makers which are capable of producing so-called "good" coffee by eliminating many of the variables with respect to the operation of a coffee maker so as to insure that the bean material processed in these devices is contacted with water within a desired temperature range for a predetermined period. These variables are considered to relate primarily to the failure of various individuals who make coffee to properly watch and control the operation of a coffee maker. There is also a very definite need for providing efficient coffee makers which will not only produce "good" coffee but which are capable of producing quantities of such coffee depending upon the demands for the beverage encountered. A related need is to provide coffee makers which can supply good quantity coffee beverage as required so that the coffee is always fresh or relatively fresh as it is served to a customer. A related need is to provide coffee makers which are essentially of an automatic variety and which are capable of giving prolonged, satisfactory service with a minimum of maintenance.

A broad object of the present invention is to provide a new and improved coffee maker meeting these needs. Thus, an object of the present invention is to provide a coffee maker capable of producing various quantities of "good" coffee by U.S. standards depending upon the demands for this beverage in a specific establishment. Another broad object of the present invention is to provide coffee makers of this type which are essentially of an automatic variety, and which are capable of giving prolonged, satisfactory service in a restaurant or related establishment. Another closely related object of this invention is to provide coffee makers which are very easy to operate, and which can be manufactured and constructed at a comparatively nominal cost.

These and various other objects of this invention as well as many specific advantages of it will be more fully apparent from a detailed consideration of the remainder of this specification, the appended claims, and the accompanying drawings in which:

FIG. 3 is a cross-sectional view taken at line 3—3 of FIG. 1;

FIG. 4 is a partial cross-sectional view taken at line 4—4 of FIG. 3;

FIG. 5 is an enlarged, partial cross-sectional view showing certain parts of this coffee maker as they are illustrated in FIG. 3;

FIG. 6 is a partial cross-sectional view taken at line 6—6 of FIG. 3;

FIG. 7 is a partial cross-sectional view corresponding to part of FIG. 3 showing certain parts illustrated in FIG. 3 enlarged from the manner in which these parts are shown in FIG. 3;

FIG. 8 is a partial cross-sectional view taken at line 8—8 of FIG. 7;

FIG. 9 is a partial cross-sectional view taken at line 9—9 of FIG. 3;

FIG. 10 is a plane view showing a part of the structure illustrated in FIG. 9;

FIG. 11 is a partial cross-sectional view corresponding to part of FIG. 3 pertaining to a modified form or embodiment of this invention;

FIG. 12 is a schematic view of part of the coffee maker shown in FIGS. 1-10 of the drawings;

FIG. 13 is a schematic view showing the orientation of certain valves as illustrated in FIG. 12 during the operation of this coffee maker; and FIG. 14 is a schematic view showing electrical connections within the coffee maker shown in FIGS. 1-10 of the drawings.

The accompanying drawings are primarily intended so as to clearly illustrate several presently preferred embodiments or forms of this invention. From a careful consideration of these drawings and of the remainder of this specification it will be realized that the basic principles of this invention as summarized by the appended claims may be embodied within other differently appearing coffee makers or coffee making structures through the use or exercise of routine engineering or design skill or ability.

As an aid to understanding this invention it can be stated in essentially summary form that it concerns a coffee brewing machine wherein all the operations of supplying whole roasted coffee beans, measuring necessary quantities of beans, grinding the beans, preheating brewing water, storing heated brewing water, dispensing brewed coffee and cleaning the machine for the start of another cycle are automatically effected in conjunction with a program timer forming part of the machine. Basically, the machine includes a plurality of chambers, some of whose volumes may be manually reset for the brewing of different quantities of coffee and which include hydraulically actuated pistons to effect certain of the brewing operations. The machine further includes a supply hopper for unground coffee beans which is programmed to supply beans to a measuring device which in turn feeds a measured quantity of beans to a grinding compartment. The ground coffee is mixed under hydraulic force with a supply of preheated water for a period necessary to impart the coffee flavor to the preheated water. The resultant coffee is then automatically dispensed from the machine by hydraulic force into conventional decanters. Finally, the spent grounds are flushed from the machine to leave a clean machine for subsequent brewing cycles.

Figure 1:
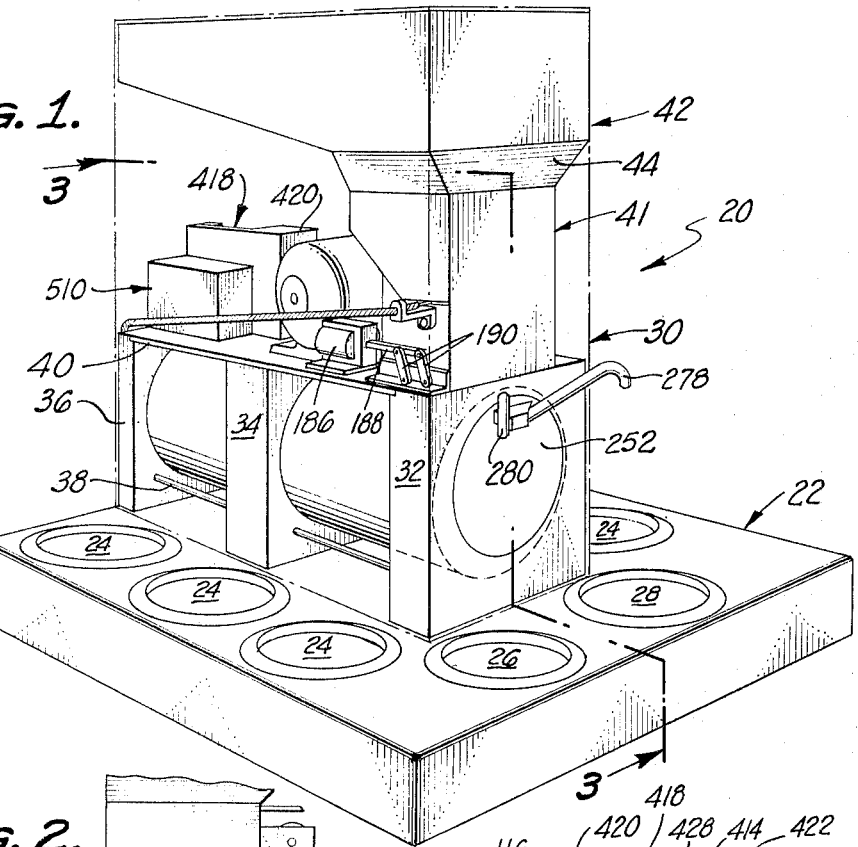
FIG. 1 is a perspective view of a presently preferred embodiment or form of a coffee maker of this invention.

The structure required to perform the above described operation is shown in the accompanying drawings wherein FIG. 1 shows the general structure of the preferred form of the coffee brewing machine of this invention, which is generally identified by the reference character 20. Basically, this machine comprises an elevated base structure 22 which includes a plurality of conventional electric warming plates or burners 24 and two front plates or burners 26 and 28. An upstanding section 30 is centrally and suitably supported on the base which embodies the major parts of the machine. The upstanding section 30 is generally defined by three upstanding support members 32, 34 and 36, which are suitably secured in evenly spaced relation by means including tie-bars 38 and an attached top plate 40, the latter, also, being utilized to support operating elements of the machine. A coffee bean supply, measuring and grinding assembly 41 is mounted at the front end of top plate 40 and extends generally upwardly and rearwardly therefrom.

Referring to FIGS. 1, 3 and 6, the assembly 41 comprises a top disposed hopper or bin 42 having side walls 44 whose interior surfaces 46 generally slope inwardly to a pair of bottom openings 48. This assembly also includes a measuring compartment 50 having a straight front wall 52, partially sloped rear wall 54 and confronting movable side walls 56, see FIG. 6, defining a top inlet opening 58 in alignment with the openings 48 and an open bottom 60. The assembly further includes a coffee bean grinding mechanism 62 having side walls 64 secured to top plate 40 by means of L-brackets 66, front wall 68 and a rear wall 70, which walls define a top opening in alignment with the opening 60 and an open bottom 72 in registration with an opening 73 leading to a brewing chamber, to be described.

As shown in FIG. 6, the side walls 56 of the measuring compartment 50 are slidably connected to a connector plate 74 joining the hopper 42 to the measuring compartment, and the side walls 64 of the grinding mechanism by means of conventional key and key way assemblies 76. An adjustment screw 78 having a turning knob 80 is received in reversely threaded apertures 82 in each of the side walls 56 whereby the knob may be turned to adjust the interior capacity of the compartment 50 to permit different quantities of coffee beans to be passed thereto from the hopper 42 to regulate the strength of coffee to be brewed. Obviously for weaker brews the walls would be drawn inwardly toward the dashed lines 84 and in a reverse direction for stronger brews. The measuring compartment is provided with a central dividing wall 86 rotatably attached at the center of adjusting screw 78 by means of a ferrule 88 fixed to the adjustment screw. This dividing wall is utilized in conjunction with a slide plate 90 which when in the righthand position, in FIG. 6, prevents coffee beans in the lefthand measuring compartment from falling through to the grinding mechanism when the machine is adjusted to brew twelve cups of coffee, in a manner to be described. As can be seen in FIG. 6, the slide plate 90 is retracted into a slot 92 between the lefthand side walls of the measuring compartment 50 and the grinding mechanism to the dashed position 94. Retraction is effected by a control wire 96 of a conventional Bowden cable 98 having an extremity mounted upon a bracket 100 of the grinding mechanism. Such retraction permits the beans on both sides of the dividing wall 86 to pass from the measuring compartment to the grinding mechanism. This latter adjustment of the slide plate is utilized when the machine is adjusted to brew twenty-four cups of coffee and is effected by a solenoid 101 supported on the rear of the machine.

The grinding mechanism 62 is formed by a serrated grinding wheel 102 recessed in a clearance compartment 104 formed in the rear wall 70 and a hardened flat faced confronting insert 106 embedded in a thickened section of the front wall 68. The wheel 102 is fixed to a shaft 108, rotatably supported in sleeve bearings 110. An end of the shaft extending beyond the right hand side wall of the grinding mechanism is provided with a follower pulley 112, which is driven by a belt 114, which is in engagement with a drive pulley 116 mounted on the drive shaft 118 of an electric motor 120 utilized to power the grinding mechanism.

The flow of coffee beans between the hopper 42 to the measuring compartment 50, and from the measuring compartment to the grinding mechanism is controlled by slide valves 122 and 124, respectively, while the flow of freshly ground coffee from the grinding mechanism through the open bottom 72 thereof is controlled by a third slide valve 126. The valve 122 comprises a pair of openings 128 normally open or in alignment with the openings 48 in the bottom of the hopper. This valve is slidingly disposed in slots 130, see FIG. 6, in the connector plate 74. This valve is provided with a compression spring 132 normally positioning the valve in its open position. The valves 124 and 126 are of solid construction and are biased to a forward or closed position by tension springs 134 and 136 to normally close off the bottom openings 60 and 72, respectively, of the measuring compartment and the grinding mechanism. As can be seen from FIG. 3, the compression spring 132 normally positions slide valve 122 in its rearward position, or open with respect to the hopper, and the tension springs 134 and 136 normally position the slide valves 124 and 126, respectively, to their forward positions, wherein they are each closed with respect to the measuring compartment and the grinding mechanism. These valves are simultaneously driven to their opposite positions against the bias of springs 132, 134 and 136 by the movement of the armature 138 of a solenoid 140 as it moves from its normally extended position to the retracted position 142 shown in dashed lines in FIG. 3, upon energization of the solenoid.

This drive is effected by a series of pulleys more clearly seen in FIG. 4 and a series of tension wires interconnecting the pulley to the armature and the valves as shown in FIGS. 3 and 4. The top pulley bank 144 constitutes a drive pulley and includes pulley tracks 146, 148, 150 and 152, which are constrained to move in unison. The middle pulley bank 154 includes two pulleys 156 and 158 free to rotate in opposite directions with respect to each other. The bottom pulley 160 comprises a single track and may rotate in either direction. These pulleys are rotatively disposed on suitably supported shafts, and as the shaft 162 associated with the top pulley bank 144, supported between plates 163 attached to the grinding mechanism. Drive is imparted to the top pulley bank by means of a tension wire 164 secured at one end to the armature 138 and trained in a counterclockwise direction around the pulley track 150 to a point 166, where it is fixed to the track. Accordingly, retraction of the armature will rotate the entire pulley bank 144 in a clockwise direction. The slide valve 122 is moved forward to its closed position upon retraction of the armature by means of a tension wire 168 connected at one end of the slide and trained in a clockwise direction along pulley track 146 to a point 170, where it is fixed to the pulley track. The slide valve 124, is moved to its rearward, or open position, by a tension wire 172 connected at one end to the valve 124 and trained in a clockwise direction around the pulley track 158 and in a clockwise direction around the pulley track 152 to a point where it is fixed to the pulley track 152. Similarly, slide valve 126 is moved to its rearward, or open position, by a tension wire 176 attached at one end to the slide valve and trained in a clockwise direction around the pulley track 160, in a counter clockwise direction around the pulley track 156 and in a clockwise direction around the pulley track 148 to a point where it is suitably fixed to the track. By the above arrangement, retraction of the armature 138 will cause slide 122 to move to its closed position and slides 124 and 126 to move to their open positions, while the return of the armature 138 to its extended or unenergized position will cause these valves to return to their normal positions by the action of springs 132, 134 and 136.

Valve 126 is further provided with means to seal the valve with respect to the opening 73 leading to the brewing chamber immediately therebelow. This sealing means comprises a resilient pad 178 recessed in the top plate 40 adjacent to and surrounding opening 73 on the lower side of the slide valve 126 and a pair of cooperating cams 180 overlying the pad 178, and rotatively disposed in elongated openings 182 in the rear and front walls of the grinding mechanism. As can be seen most clearly in FIGS. 3 and 5, the cams 180 comprise a round rod having a flattened surface 184, which is disposed adjacent the top surface of the slide valve 126, when this assembly is in its unsealed condition. The cams 180 are rotated in a counter clockwise direction when sealing is desired to be effected so that the rounded part of their surfaces is in contact with the top surface of the slide valve 126 to compress the bottom surface thereof into tight sealing relation with respect to the resilient pad 178. Rotation of the cam rods 180 into and out of sealing position is effected by a solenoid 186 which is programmed in a manner to be described. The solenoid 186 is provided with a conventional armature 188 normally in extended position with respect to the coil structure of the solenoid as shown in FIG. 1. Two spaced links 190 are pivotally connected at one of their ends to the armature 188 and are connected in fixed relation to the cam rods 180 at their other ends. From the above arrangement it can be seen that when the solenoid 186 is energized retraction of the armature 188 will cause counterclockwise rotation of the cam rods 180 to the position shown in FIG. 1, wherein the rounded portion of their surfaces causes sealing compression of the bottom surface of the slide valve 126 with respect to the resilient pad 178.

As described in conjunction with the basic structure of the coffee brewing machine 20, the ground coffee from the grinding mechanism 62 is programmed to enter a brewing chamber through the opening 73, where it is blended with hot water, to form the final coffee brew. This portion of the machine will be described in conjunction with FIGS. 1, 3, 6 and 12. As shown in these figures, the front support 32 and middle support 34 are provided with confronting recessed seats 192 and 194, respectively, wherein a cylindrical chamber wall 196 is seated in sealed relation by means of suitable sealing gaskets 198 and 200, respectively. A similar chamber wall 202 is sealed in recesses 204 and 206 of supports 36 and 34, respectively, by sealing gaskets 208 and 210 whereby chamber wall 202 is disposed in coaxial alignment with the chamber wall 196. As may be seen from FIG. 3, this arrangement provides a sealed front cylindrical compartment 212 defined by the supports 32 and 34 and the cylindrical wall 196, and a sealed rear cylindrical compartment 214 which is defined by the supports 34 and 36 and the cylindrical wall 202.

These two compartments 212 and 214, are subdivided in four separate hydraulic chambers whose size and is hydraulically controlled in a manner to be described. These chambers are defined by the inside walls of supports 32 and 36 and the opposite walls of the middle support 34 in conjunction with a shuttle piston assembly 216, which comprises a pair of pistons 218 and 220 disposed a fixed distance apart, in compartments 212 and 214, respectively, by means of an interconnecting tubular shaft 222. The shaft 222 is slidingly sealed in a central passage 224 extending through the support 34 by means of an O-ring gasket 226. The front piston 218 of the shuttle piston assembly is operatively associated with a forward piston 228 faced with a cup-shaped sealing gasket 229. A coffee brewing chamber 230 is defined within the cylindrical wall 196 by the forward piston 228 and the inner wall of support member 32. A preheated water storage chamber 232, which houses an electric heating coil 234, suitably attached to the support 34 and provided with external terminals 236, is formed by the confronting walls of the support 34 and the front piston 218 and the cylindrical wall 196. A third chamber 238 for preheating water is defined by the space between the support 34 and rear piston 220 within the cylindrical wall 202. This third chamber, also, includes an electric heating coil 240 disposed adjacent support 34 which is provided with external terminals 242. A fourth chamber 244 utilized to hydraulically displace the shuttle piston to a forward position is defined by the space within the cylindrical wall 202, the support wall 36 and the rear face of piston 220. The pistons 228, 218 and 220 are provided with peripheral sealing gaskets 246, 248 and 250, respectively, which effect sliding seals with respect to the appropriate cylindrical walls 196 and 202, as the pistons are moved between their extreme positions during a brewing cycle, as the sizes of these four chambers are varied during a brewing cycle.

The brewing compartment 230 includes a circular door 252 suitably hinged for operation with respect to an access opening 254 situated in the front support 32, which forms a continuation of the support when in its closed position. This door is provided with a peripheral sealing gasket 256 disposed in the door edge recess 257 which cooperates in the usual fashion to provide a seal with respect to the opening 254. This door also includes the necessary arrangement for dispensing the brewed coffee. As may be seen in FIGS. 3 and 9, this arrangement comprises a circular close meshed or finely perforated strainer 258, which is suitably secured over an inner recess 260, central of the door. An outer recess 261 is provided in overlying relation to a portion of the recess 260. This outer recess is provided with a central opening 262 which is sealed by means of an O-ring 263 with respect to the rear surface of a distribution head 264, which is suitably mounted in the recess 261 of the door. This distribution head includes a passage 268 in communication at one end with the opening 262 in the recess 261, and whose other end provides entrance to a central passage 270, within the distribution head. The ends of the passage 270 are provided with valve seats 272 and 274 which communicate with similar valve accommodating chambers 276, that provide passage to tubular dispensing spouts 278 and 280 threadedly received in the openings 282 and 284, respectively, in the angled front surfaces 286 and 288 of the distribution head.

The passage 270 is provided with a double piston valve assembly 290, which comprises a valve head 292 for cooperation with valve seat 274 and another valve head 294 which cooperates with the seat 272. Each of the valve heads includes a peripheral gasket 296, to effect a dependable seal with respect to the valve seats. The valve heads are disposed in fixed relation on a valve rod 298, which is conducted through an opening 300 in the distribution head into an open cavity 302 adjacent an edge of the door 252, where adjacent the end of the rod there is provided a fixed stop washer 304, which cooperates with a compression spring 306, encased within the cavity 302 to normally bias the valves into their right hand position as shown in FIG. 9. In this position brewed coffee being forced through the strainer 258 will freely pass through the passages 268 and 270, and be dispensed through the spout 278, since passage to the spout 280 is closed off by the valve head 292. This is the normal setting of the machine when a small quantity of twelve cups of coffee are being brewed since such a quantity may be easily accommodated by a single decanter, which of course would be positioned on the burner 28, beneath the spout 278. However, in view of the automatic nature of this machine, when the controls are set to brew a larger amount of coffee, in this case twenty-four cups, an arrangement is provided to shift the valve assembly to the left, as viewed in FIG. 9 until the first twelve cups of coffee have been allowed to pass through the dispensing spout 280. This arrangement includes a rotary acting solenoid 308 disposed in a housing cavity 310 of support 32, which is energized in a manner to be described, to rotate its actuator 312 from its normal position to which it is biased by spring 309, as shown in FIGS. 9 and 10, in a clockwise direction. The actuator 312 is engaged in a slot 314 at one end of a push rod 316 that passes through a passage 318 in alignment with the end of the valve rod 298. In this manner the first twelve cups of coffee will always flow through the dispensing spout 280 and upon the solenoid 308 being energized, the push rod 316 will be retracted to the position shown in FIG. 9. This will permit the spring 306 to position valve head 292 in its seat 274 and the valve 294 to move away from its seat 272 thus permitting the second twelve cups of coffee to flow through the dispensing spout 278 into a decanter which will, of course, be positioned on the burner 28.

FIGS. 7 and 8 most clearly show the concentric shaft assembly 320 required to mechanically position the shuttle piston assembly 216 and forward piston 228 to condition the coffee machine for brewing the two different quantities of coffee. This shaft assembly 320 also includes structure permitting the different displacements of these pistons by a hydraulic system to be described.

The shaft assembly 320 is generally formed by a hollow inner shaft 322 and two telescoping intermediate shafts 324 and 326 all of which are coaxially disposed within the tubular shaft 222 of the shuttle piston assembly 216. The inner shaft 322 extends through an opening 328 in the rear support member 36 and is rotatively sealed and supported therein by means of an O-ring gasket 330 and a thrust plate 332 fitting into a peripheral groove 329 on the shaft 322. The end of the shaft projecting outwardly beyond the support 36 is operatively engaged by the hub 334 of a manually operated positioning arm 336, the latter being shown more clearly in FIG. 6. The portion of the shaft 322 within compartment 214 is disposed for free rotation within the telescoping shafts 324 and 326 to where it terminates at an end 338 proximate the support member 34. Outer telescoping shaft 324 is supported in alignment with the opening 328 on the support 36 by means of a flange 340 threadedly engaged on the shaft and suitable fasteners, such as bolts 342 which extend through support 36 and thrust plate 332. In order to maintain the compartment 214 sealed O-rings 343 are provided in the support 36 adjacent the bolts 342. The end of the shaft 324 is sealed with respect to the support 36 by means of an O-ring 345. The free end of the shaft 324 is disposed within the tubular shaft 222 of the shuttle piston assembly 216 and is sealed in sliding engagement with the rear piston 220 by means of a conventional O-ring gasket 344. Key lugs 346 which engage in longitudinal keyways 348 in the inner bore of the tubular shaft 222 allow sliding movement of the shuttle piston assembly with respect to the shafts 322 and 324 but prevent relative rotation between these parts. The inner telescoping shaft 326 is rotatively attached to the forward piston 228 by means of a laterally extending flange 350 integral with the shaft which is rotatively disposed in a recess 352 in the wall of the piston by a loosely coupled flange 354 and screws 356 whose heads lie beneath the cup-gasket 229 of the piston. The shaft 326 extends rearwardly from the piston 228 into the space between shafts 322 and 324 and is connected to the shaft 322 by lost motion connections permitting limited relative rotation between the shaft 326 and each of shafts 222, 322 and 324. One of these lost motion connections comprises a pair of diametrally opposed slots 358 each of which is formed with an intermediate stop surface 360 defining the end of a widened portion of the slot and a second stop surface 362 corresponding with the end of the slot nearest to piston 228. As can be seen more clearly in FIG. 8, a pair of laterally extending pins 364 fixed to the outside surface of shaft 322 are disposed in the slots 358. The other lost motion connection comprises a pin 366 fixed in a hub portion 368 of the piston 218, which extends loosely through a pair of diametrally opposed helical slots 370 in the shaft 326.

By virtue of the above described arrangement, when the operating arm 336 for the inner shaft 322 is positioned in the left position, as viewed in FIG. 6, the coaxial shaft assembly will be positioned as shown in FIG. 7. This position corresponds to the twelve cup setting, and in this setting the pins 364 are aligned with the stop surfaces 360 and the rear end of the helical slots 370 are adjacent to the pin 368 fixed to the shuttle piston assembly 216. Accordingly, when the shuttle piston assembly is moved rearwardly by hydraulic pressure, in a manner to be described, assembly 216 will assume the dashed line position 372 shown in FIG. 3 and be limited to the rearward position by engagement of the stop pins 364 of the inner shaft 322 against the stop surfaces 360 on the shaft 326. When it is desired to set the machine to brew twenty-four cups of coffee the operating arm 336 is rotated to the right hand position in the direction indicated by the arrow 374 in FIG. 6. During the first part of this rotation the pins 364, as viewed in FIG. 7, will advance in a clockwise direction until they abut the opposite edges of the slots 358. Further rotation of the operating arm will cause rotation of the shaft 326 rotatively attached to the forward piston 228. Such rotation of shaft 326 will cause the piston 228 and shaft 326 as a unit to move rearwardly, due to the helical slots 370 working against the fixed pin 368. During this movement of the piston 228 the piston is restrained from turning or twisting by the slide coupling between the pin 376 fixed to the piston and the free path within the threaded hollow member 378 attached to the adjacent nonrotatable piston 218. The retraction of the forward piston is necessary to provide an enlargement of the brewing chamber when the shuttle piston assembly is in its advanced position to permit room for the additional amount of freshly ground coffee required to brew the large quantity of coffee. When the piston assembly 216 is disposed in this condition the stop pins 364 will be aligned with the end stops 362 in the slots 360, thus permitting full retraction of the shuttle piston assembly to increase the size of the brewing chamber 230.

When the shuttle piston assembly is disposed in the twenty-four cup brewing position the solenoid 308 must be energized upon retraction of the shuttle piston assembly rearwardly beyond the dashed position 372, shown in FIG. 3. This is to provide for shifting of the piston assembly 290 in the distribution head 264 to first fill the decanter located beneath the pouring spout 280, and to route the remaining twelve cup quantity of coffee through the dispensing spout 278. The structural arrangement necessary to accomplish this is shown in FIG 7, and includes a normally open electric switch 380, whose actuating button 382 is controlled by a conventional leaf spring 384, secured at one end to this switch and having a roller cam follower 386 at its other end normally disposed through an opening 388 in a tube 390. The tube 390 is suitably disposed in parallel relation to the rear support member 36, by means of mounting brackets 392, for example, and in alignment with the open rear end of the inner shaft 322. The actuator for the cam follower 386 is in the form of a flexible cable 394 disposed in the tube 390 and the inner bore of the shaft 322, and having one end attached, as by a weldment for example, at a point 396 to the rear end of a push rod 398, which extends from the bore of shaft 322, to where it is joined by a weldment to a cylindrical member 400 through which the pin 366 extends. By this arrangement movement of the stop surface 360 past the cross pins 364, by motion of shaft 326 with its piston 228 with respect to shaft 322, when the machine is set for twenty-four cup brewing capacity, causes the end 402 of the flexible cable 394 to contact and depress the roller cam follower 386, thus energizing switch 380, which completes an electrical circuit utilized to energize the solenoid 308, which in turn shifts the valve assembly 290, to divert the flow of coffee from spout 278 to spout 280. The cam follower 386 will remain depressed by further movement of the piston assembly 216 rearward to its extreme position in the direction to the left as viewed in FIG. 3, thus maintaining the valve assembly 290 in its described left position. This valve will remain in this position until the shuttle piston assembly is again moved forwardly past the dashed line position shown in FIG. 3, at which time the electric circuit controlled by switch 380 will be broken permitting the solenoid to return to its normal position shown in FIG. 8.

The hydraulic system for controlling the movement of the shuttle piston assembly 216 during various stages of the operating cycle of the machine is shown in diagrammatic representation in FIGS. 12 and 13. The various conduits represented in these figures are shown as being largely external of the support members 32, 34 and 36, however, it is to be understood that they may be conveniently located within the support members and the base structure 22.

Figure 2:
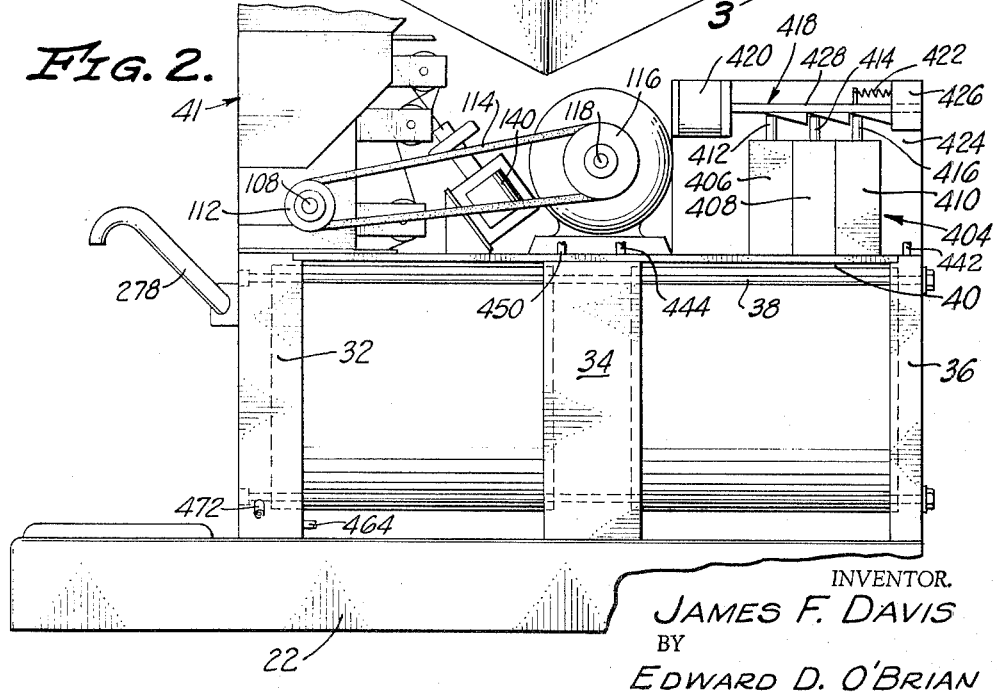
FIG. 2 is a side elevational view of this coffee maker.

The hydraulic system is controlled by valve assembly 404, which is shown in FIG. 2 and in diagrammatic form in FIGS. 12 and 13. This assembly comprises a set of three-way hydraulic valves 406, 408 and 410, which are operated in a conventional manner by vertically movable valve plungers 412, 414 and 416 to divert the flow of fluid therethrough from one direction of flow to another in response to a common actuating cam assembly 418, which is controlled by a solenoid 420 for one direction of movement against the force of a return spring 422, which returns the cams to the right, as viewed in FIG. 2, when the solenoid 420 is not energized. The parts of the assembly 404 are suitably supported from a metal plate 424, for example, attached to the top plate 40, which includes a guide member 426, for the movable armature 428 of the solenoid 420.

FIG. 12 shows the disposition of the valves 406, 408 and 410 at the beginning of a brewing cycle. Ordinary city water is supplied from a water pipe 430 to a common water pressure regulator 432, which in turn supplies water through a connecting tube 434 to the flow passage 436 of valve 406 in a first direction. During this stage of the brewing cycle, the water will be conducted from valve 406 through a connecting tube 438 to a similar flow passage 440 of valve 408, which in turn is connected by a tube 442 extending through the rear support 36 to the interior of the chamber 244. As water enters the chamber, under the pressure of the regulator 432, the chamber 244 expands by pushing the shuttle piston assembly 216 to its extreme forward position. This will cause preheated water in the chamber 238 to be pushed out of the chamber by the action of the rear piston 220, through a tube 444 and a connecting tube 446 through a passage 448 of the valve 410. Upon passage through the valve 410, the preheated water is forced through a connecting tube 450 into the preheated water storage chamber 232. Also during this stage of operation, the coffee brewed in the chamber 230 will be forced out of the dispensing spout 278, and the spout 280 if the machine is set for brewing the larger amout of coffee.

While the flow for this stage of the brewing cycle has been dynamically described, it is to be understood that the machine is in the condition shown in FIG. 12 at the beginning of each brewing cycle. Initially, coffee beans are measured, ground and fed to the chamber 230, in a manner to be described, after which the valves 406, 408 and 410 are simultaneouly positioned as shown in FIG. 13 by the action of the cam assembly 418. Referring to both FIGS. 12 and 13, water is supplied from the regulator 432 through pipe 434 and passage 436 to a tube 452, which connects through a conventional water filter 454 and tube 456, and then through the tube 444 into the water preheating chamber 238. The water in the chamber 244 will be forced out through tube 442, passage 440 of valve 408 to a discharge drain 458. Preheated water stored in chamber 232 will be discharged out of chamber 232 by the action of piston 218 through tube 450 and passage 448 of valve 410 to a tube 460. The tube 460 leads to a pair of discharge nozzles 462 and 464 which discharge the preheated water into the brewing chamber 230. The nozzles 462 and 464 each have a relatively small discharge orifice to provide considerable agitation of the water and coffee grounds present in the chamber 230, to assure proper and rapid brewing of the coffee. A valve 466 is provided in a tube 468 branching from the tube 460, which is controlled by a solenoid 470 that is programmed in a manner to be described to restrict the flow of preheated water to the nozzle 462 when the machine is set for brewing the small quantity of coffee and to open the valve 466 to permit both nozzles 462 and 464 to be supplied from the tube 460, when the larger quantity of coffee is being brewed.

The hydraulic system shown in FIG. 12 also includes an arrangement for flushing the used grounds from the brewing chamber 230, and for draining the flush water from this chamber. This arrangement includes a tube 472 that is supplied directly from the city water system and which passes through the front support member 32 and opens into the brewing chamber as shown in FIG. 6. The flow of flush water through the tubes 472 is controlled by a valve 474, which is operated between its open and closed positions by a solenoid 476. Drainage of the brewing chamber is effected through a valve structure 477, FIG. 3, comprising a drain passage 478 leading from the bottom of the brewing chamber to a communicating passage in a valve housing 480, located below the support 32 and chamber 230. This valve includes a valve head 482 slidably sealed by means of an O-ring 484 in an access opening 485, sealed by a closure plate, see FIG. 6, 486. The valve disc on the end of the valve head cooperates with a valve seat 488 formed at the entrance of a passage 490 communicating with a lateral passage 492 that is suitably connected to a drain pipe. The valve head is operated between an open and closed position by means of a valve rod 494 that extends out of the valve housing and is sealed therewith by means of a gasket 496. As shown in FIGS. 14 and 3, the valve rod 494 is pivotally attached by a pivotal connection 498 to one end of a linkage arm 499 that is centrally pivoted at 500 to the base 29. The valve head 482 is pulled to its closed position, to the left, as viewed in FIG. 3, by means of a normally extended armature 502 of a solenoid 504, which is also pivotally attached to the end 508 of link 499. A second solenoid 506 is utilized to open the valve head 482. This is accomplished by the pivotal attachment of the normally extended armature of the solenoid 506 to the linkage arm 499. It can be seen that when the solenoid 504 is energized, the arm 499 pivots in a counter clockwise direction, as viewed in FIG. 14, and when the solenoid 506 is energized, the arm 499 will be turned in the opposite direction required to move the valve head 482 to its open position. The valve head 484 is operated between its open and closed positions by means of a pair of solenoids 506 and 504, respectively. The solenoid 504 is equipped with normally extended armature 502 which is pivotally connected at 508 to the linkage arm 499 at the lower end of link 499, and the solenoid 506 includes a normally retracted armature which is pivotally connected to the arm 499. Accordingly, when solenoid 504 is energized, the arm 499 will turn counterclockwise, thus closing the valve head 482 with respect to the seat 488, and conversely, when solenoid 506 is energized, the arm 499 will be turned in the clockwise direction required to move the valve head to its open position.

The electrical arrangement necessary to program the various solenoids and motors described above for required sequence of operation is shown schematically in FIG. 14. This programming is principally effected by a multi-circuit timer generally identified by a reference character 510 in FIG. 1. This timer is a conventional type and will be described from its diagrammatical representation in FIG. 14. It generally comprises an electric driving motor 512, which is suitably connected, as by gears, to rotate a shaft 514 provided with a plurality of cams 516, which operate individual switches in a well known manner. Here, the switches are identified by the reference characters 518, 520, 522, 524, 526, 528, 530 and 532, each of which includes normally open contact arms 536, which when depressed by the cams 516 electrically connect supply terminals 538 to switching terminals 540 of the individual switch. For simplicity, only the parts of switch 518 are identified by reference characters in the drawing, it is to be assumed that all of the switches are identically constructed. It is to be understood that the configurations of the cams 516 are individually designed in a conventional manner to provide the open and closed circuit conditions required of the switches with which they are associated.

Electric power is applied to the motor 512 of the program timer 510 from an input terminal 542 which is connected to a suitable electric source. Terminal 542 is connected by lead 544 to a first terminal 546 of a starter switch 548. This switch is provided with an operating button 550 which must be held in its depressed position to bridge the terminal 546 and the other terminal 552 of the switch. Terminal 552 is connected by lead 554 to the contact arms of 556 and 558 of switches 560 an 562. The switches are connected through their switching terminals and lead 564 directly to one input terminal of the timer motor 512, whose other input terminal is ground by lead 565, and the switching contact 540 of the timer switch 518. The contact arm terminal 538 of timer switch 518 is connected by lead 566 to the power line 544. Switches 560 and 562 are suitably situated on the support member 36 and are actuated by the operating arm 336 when in the positions adjusting the shuttle piston for twenty-four cup and twelve cup brewing capacities, respectively. Accordingly, the above described circuit permits the timing motor to be started only when the operating arm 336 is positively positioned in either of its adjustment positions. To start operation of the machine it is required that the operator hold the starter button 550 depressed until the timer motor 512 runs sufficiently long to cause cam 516 to close the timer switch 536 which will complete the circuit comprising lead 566 to provide electric power for the timer motor.

Electric power is connected to each of the contact arm terminals 538 of the remaining switches of the timer through connection to lead 568 which in turn is connected to the lead 566 leading from the power line. By this arrangement when switch 522 is cammed closed power is provided through connection 572 to the solenoid 506 which operates to open the flush valve 477 for the brewing chamber 230 in the manner previously described. Similarly, when switch 520 is cammed closed the solenoid 504 is energized through connection 572 to close the drain valve 477. It is to be noted that the circuit through each of these solenoids 504 and 506 is completed by the common ground connection 574.

Closing of the switch 524 by actuation of its switch arm by its controlling cam 516 will energize solenoid 140 through lead 576 and ground connection 578 thereby moving the valves 124 and 126 to their open positions and valve 122 to its closed position in the manner described.

When switch 526 is closed by its operating cam the solenoid 186 will be energized through connection lead 580 and ground connection 582 to seal the entrance from the grinder mechanism 62 to the brewing chamber 230 in the manner described in conjunction with FIG. 5.

Closure of the switch 528 in a similar manner will energize the grinder motor 120 through lead 584 and ground connection 586.

Actuation of switch 530 by its operating cam 516 will energize the solenoid 420 to position valves 406, 408 and 410 in the position shown in FIG. 13, through lead 588 and ground connection 590. Also, actuation of this switch will energize a relay 592 which controls a circuit comprising an input terminal 594 which is connected to an electrical sourse, lead 596 connecting through a heavy duty circuit breaker 598 and lead 600 and the other side of the relay 592, lead 602, heating coil 240 and terminal 542 to thereby energize the heating coil 240 in the water preheating chamber 238. This arrangement assures that the water being admitted to the preheat chamber 238 will immediately be subjected to heating temperature upon the actuation of valves 406, 408 and 410. In connection with this portion of the circuit it is to be noted that the energization of the relay 592 is subject to a conventional thermostat 606 through the connection 608 from the relay 592 and the ground connection 610. This arrangement will effectively subject the operation of the heating coil 240 to the operation of the timing switch 530. Hence, it is apparent that this heating coil is only utilized during operation of the coffee machine to brew a batch of coffee. However, since this machine is intended to be used daily, the heating coil 234 in the heated water supply is made independent of the operation of the timer. This is effected by the connection 612 from lead 596 through the coil 234 and lead 614 through a controlling thermostat 616 to the common ground connection 610 for thermostat 606. This arrangement permits the machine to be energized over a long period to maintain a supply of correctly heated water for instant operation of the machine for coffee brewing purposes.

Actuation of switch 532, in the manner of previously described timer switches, permits energization of the solenoid 476 through lead 616 and ground connection 618 to open the flush valve 474 to provide flushing water through the tube 472 to clean out the brewing compartment of spent coffee grounds and objectionable residue after a batch of coffee has been brewed. This valve operates in conjunction with the drain valve 477 in a manner to be described in conjunction with the operating cycles of the machine.

The above description of the circuit of FIG. 14 relating to the program timer 510 defines the necessary operations of the coffee brewing machine 20 relative to a twelve cup setting of the machine, by appropriate positioning of the operating arm 336. When the operating arm 336 is positioned to set the shuttle piston 216 for the brewing of a twenty-four cup batch of coffee, certain other operations are required by the machine.

As previously described, in order to condition the machine to brew the larger twenty-four cup quantity of coffee, it is first required that the operating arm 336 be positioned in right hand position as viewed in FIG. 6. This will cause the switch 562 to open and the switch 560 to close by the action of the arm 336. As can be seen in FIG. 14, this will preserve continuity with respect to leads 554 and 564, thereby maintaining the conditions required for starting the timer motor as previously described. The closing of switch 560 will provide electric power through the second contact arm 620 of the switch, lead 622 and ground connection 624 to energize the solenoid 470 to open the valve 466 to permit the second jet 464 to inject hot water into the brewing chamber along with the jet 462, as shown in FIG. 12. Switch 560 and lead 622 are also utilized to energize solenoid 101 through lead 628 and ground connection 630. The armature of this solenoid 626 is connected to the Bowden cable 98 and its retraction upon energization causes the cable 98 to be moved to the left as viewed in FIG. 6, to move the slide plate 90 to the dashed line position thereby to permit the coffee beans on both sides of the partition plate 86 to be supplied to the grinding mechanism 62, upon normal actuation of the slide valve 124.

Finally, when the machine is set for brewing twenty-four cups of coffee, the switch 380 shown in FIG. 7 is energized by the described movement of the actuating cable 270 to energize the solenoid 308 through lead 632 and ground connection 634 to actuate the valve assembly 290 to permit the second dispensing spout 280 to be opened and the spout 278 to be closed when the shuttle piston assembly passes the dashed line position 372, shown in FIG. 3.

Having described the structural and electrical arrangement of the coffee brewing machine 20, the operation of the machine will now be summarized.

When it is desired to use the coffee brewing machine 20 of this invention, it is first required that the operator place a decanter under the dispensing spout 278, when the selector arm 336 is positioned in the left hand position of FIG. 6, or place a decanter under each of the dispensing spouts 278 and 280 when the selector arm 336 is positioned to the right, as viewed in FIG. 6. After the above has been effected, the operator will then depress the starting button 550 and hold it depressed until the cam 516 of the timer switch is turned by the motor 512 a sufficient amount to close switch 518. Such depression of button 550 will start the timing motor 512 and upon energization of switch 518 will assure its operation throughout the cycle of operation. When these steps have been accomplished by the operator, the remaining operations of the machine are automatically effected by the operation of the program timer 510. Thereafter the timer motor will continue to operate until the camming configuration of the cam disc 516 of switch 518 causes the switch 518 to open thus turning the timer motor off. After the timer motor has begun its cycle of operation switch 520 will be closed thereby energizing solenoid 504 to close the drain valve 477 to close off the brewing chamber 230. Next, the timer switch 528 will be closed to provide electric current to start the grinder motor 120. After the motor 120 is put into operation the timer switch 524 will be closed by its cam 516 to change the positions of valves 122, 124 and 126. This will permit closure of the slide valve 122 and the measured amount of coffee in the measuring compartments 50 to be sealed from further entrance of coffee beans from the storage hopper 42. Simultaneously, valves 124 and 126 will be opened, permitting the coffee beans to fall from the measuring mechanism 50 to the grinder 62, and the ground coffee from the grinder to fall into the adjusted brewing compartment 230. After sufficient time the switch 524 will be turned off by its operating cam 516 and slide valves 122, 124 and 126 will return to normal positions. Switch 526 will be actuated to seal the opening 73 between the grinder mechanism and the brewing compartment 230 and switch 528 cuts off the grinder motor. Thereafter the switch 530 will be closed to position valves 406, 408 and 410 in the position shown in FIG. 13, to permit the chamber to discharge the water contained therein through drain 458, FIG. 12, and permit chamber 238 to be filled with water to be preheated and the stored preheated water in chamber 232 to be discharged into the brewing chamber 230. After the latter has been effected, the solenoid 420 is de-energized by the action of the cam contacting switch 530, thus reverting the valves 406, 408 and 410 to the condition shown in FIG. 12. During this period the brewed coffee present in the chamber 230 will be discharged through the filter 258 and spouts 278 or 280 and the preheated water in chamber 238 will be admitted to the hot water storage compartment 232. After the coffee is decanted switch 522 will be closed by its cam 516 to open the drain valve 477 leading from the brewing chamber 230. Immediately after the drain valve is opened, switch 532 will become energized to open the flush valve 474 to provide a flow of flushing water from tube 472 through the brewing chamber to remove the used coffee grounds therefrom. After completion of the flushing operation, switches 526 and 532 will be opened by their controlling cams to remove the seal effected by solenoid 186 and cut-off the supply of flush water flowing from tube 472, respectively. The final event in the brewing cycle will be the opening of the switch 518 which will turn off the timer motor 512. This cycle of operation can be repeated immediately or after the lapse of any desired period of time, by again depressing the start button in the manner described.

A modified form of the shuttle piston assembly shown in FIGS. 3 and 7, may be embodied in the above described embodiment of the coffee brewing machine. The shuttle piston assembly 700, shown in FIG. 11, can be operated from the front rather than the rear of the machine. This arrangement utilizes the same support members 32, 34 and 36, and cylinder walls 196 and 202. However, in this embodiment the forward piston 228 is eliminated and a modified shaft assembly 702 is utilized to position the shuttle piston assembly for movement to accommodate the different quantities of coffee to be brewed. The front and rear pistons 704 and 706 may be integrally formed with the tubular shaft 708. The front piston includes a cup shaped sealing gasket 710 and outer O-ring sealing gaskets 712 are provided for each piston. The piston assembly is constrained to longitudinal movement by means of a rod 714 passing through the rear piston and sealed therein by a gasket 716. This rod is received in sockets 718 in the confronting faces of supports 34 and 36. In lieu of the door 252 of the previously described embodiment this embodiment is provided with a circular front panel 720 which is movable within a recess 722 formed in the front support 32, and sealed therein by an O-ring gasket 724. The operating shaft for this embodiment includes an operating handle or arm 726 and a shaft 728 which has an enlarged section 730, rotatively secured by a plate 732 attached by screws 734 over a recess 736 in the panel 720. At its rear end the shaft 728 is rotatively connected to the rear support by means of a recessed fixture 738 secured to the rear support by screws 740, which rotatively receives an enlarged portion 742 of the shaft. The enlargement 730 is provided with a helical slot 744 which cooperates with a pin 746 fixed in the panel 720 to move the panel within the recess 722 of the front support upon turning of the handle 726. This movement of the panel will adjust the spacing between the panel and the front face of the piston 704 to accommodate the different quantities of coffee introduced through the opening 748. The shaft 728 is also provided with a slot 750 having stop surfaces 752 and 754 which cooperate with a pin 756 extending through the tubular shaft 708 in the same manner as the slot 358 in FIG. 3.

From the foregoing, it is apparent that applicant has provided new embodiments of a coffee brewing machine that may be automatically operated to brew adjusted amounts of coffee. It is, also, apparent that the above described embodiments automatically meter out the precise quantity of coffee beans and reduce the same to a fresh grind that is brought into contact with hot water in a manner to provide an optimum coffee brew. These embodiments also include features that provide for automatic flushing and cleaning of the machine after each use thereof.

It will be realized by those skilled in the art to which the invention pertains that by ordinary skills a variety of differently appearing coffee brewing machines may be designed and built utilizing the features of this invention as embodied in the above described examples of the invention. Accordingly, since the structures of this invention are susceptible to such modification, the invention is to be considered as being limited only by the appended claims.

I claim:

1. A coffee brewing machine which comprises:
   a first cylinder having a top and a second cylinder;
   a piston located within each of said cylinders;
   a brewing chamber means located at one end of said first cylinder, said brewing chamber means including a top inlet opening for introducing ground coffee beans into the interior of said brewing chamber means, a water inlet for introducing hot water into the interior of said brewing chamber means, a drain opening located at the bottom of said brewing chamber means for removing extracted, ground coffee beans from said brewing chamber means, and a coffee beverage outlet for removing the beverage coffee from said brewing chamber means, and a screen separating said coffee beverage outlet from the remainder of said brewing chamber means and said end of said first cylinder;

heating means located so as to be exposed to the interior of said other end of said first cylinder;

mechanical means connecting said pistons within said cylinders so that movement of said piston within said second cylinder causes movement of said piston within said first cylinder;

fluid control valve means for controlling the movement of water into said second cylinder so as to control the movement of said piston in said second cylinder in order to control the movement of water between said other end of said first cylinder and said brewing chamber connected to each of the ends of said second cylinder, said other end of said first cylinder, said water inlet and to a source of water under pressure;

drain valve means for closing said drain opening connected to said drain opening;

sealing valve means for closing said inlet opening connected to said inlet opening.

2. A coffee brewing machine as defined in claim 1 including heating means located in the end of said second cylinder adjacent to said first cylinder and wherein said control valve means connects said cylinders so that fluid within said second cylinder is transferred to said other end of said first cylinder when said piston within said second cylinder is moved so as to move said piston within said first cylinder toward said brewing chamber means.

3. A coffee brewing machine as defined in claim 1 including adjustable means for controlling the amount said piston within said first cylinder can be moved toward said brewing chamber means in order to vary the volume of said brewing chamber means.

4. A coffee brewing machine as defined in claim 1 including hopper means, slide valve means located at the bottom of said hopper means, measuring chamber means located beneath said slide valve means, gate valve means located at the lowermost extremity of said measuring chamber means, grinder means located immediately below said gate valve means, said grinder means being connected to said sealing valve means.

5. A coffee brewing machine as defined in claim 4 including adjustable means for controlling the amount said piston within said first cylinder can be moved toward said brewing chamber means in order to vary the volume of said brewing chamber means.

6. A coffee brewing machine as defined in claim 5 including means for varying the effective volume of said measuring chamber means in accordance with the setting of said adjustable means.

7. A coffee brewing machine which comprises:

cylinder means including a first cylinder having a front wall, a second cylinder having a rear wall and a common wall between said first and second cylinders;

a piston assembly having spaced first and second pistons slidably disposed in said first and second cylinders, respectively, and a tubular shaft connecting said first and second pistons disposed for sliding movement through said common wall;

a first electric heating element disposed in said first cylinder intermediate said first piston and said common wall;

a second electric heating element disposed in said second cylinder intermediate said second piston and said common wall;

an entrance opening into said first cylinder adjacent said front wall;

a dispensing conduit extending from said first cylinder adjacent said front wall;

dispensing valve means associated with said entrance opening for dispensing fresh coffee into said first cylinder intermediate said front piston and said front wall;

hydraulic means including a plurality of valves connected so that at a first setting water is forced into said second cylinder intermediate said rear wall and said second piston to move said piston assembly toward said front wall, and so that at a second setting whereby water is forced into said second cylinder intermediate said common wall and said second piston.

8. A coffee brewing macihne as defined in claim 7 including:

first control means for actuating said valve means to dispense fresh coffee grounds into said first cylinder;

second control means for disposing said plurality of valves in said first and second settings; and programming means connected to actuate said control means so as to dispose said plurality of valves in said first setting prior to actuating said first control means to actuate said valve means and then to actuate said second control means to dispose said plurality of valves in said second setting.

9. A coffee brewing machine as defined in claim 8 including:

a mechanical control means for controlling the extent of movement of said piston assembly toward said rear wall.

10. A coffee brewing machine as defined in claim 9 wherein:

said mechanical control means includes cam means operable to control the extent of movement of said piston assembly toward said front wall.

11. A coffee brewing machine as defined in claim 10 wherein:

said piston assembly includes a third piston slidably associated with said tubular shaft and disposed in said first cylinder between said first piston and said front wall; and said cam means being operable to move said third piston relative to said second piston.

12. A coffee brewing machine as defined in claim 9 wherein:

said mechanical control means comprises a shaft coaxially received in said tubular shaft and having a lost motion connection with said tubular shaft.

13. A coffee brewing machine as defined in claim 12 wherein:

said dispensing valve means comprises a storage compartment for coffee beans, a measuring device in communication with said storage compartment and grinding storage compartment and grinding means having an opening communicating between said measuring device and said entrance opening.

14. A coffee brewing machine as defined in claim 13 wherein:

said dispensing valve means includes a first slide valve disposed between said storage compartment and said measuring device, second slide valve disposed between said measuring device and said grinding device and a third slide valve disposed between said grinding device and said entrance opening; and means for sealing said third valve slide with respect to said entrance opening.

15. A coffee brewing machine as defined in claim 14 wherein:

said measuring device includes two measuring compartments defined by fixed front and rear walls, movable side walls and a fixed wall intermediate said side walls; and adjustment means for varying the spacing between said side walls.

16. A coffee brewing machine as defined in claim 15 wherein:

said measuring device further including a slide plate disposed across one of said measuring compartments adjacent said second slide valve.

17. A coffee handling apparatus which comprises:

a storage hopper defined by front and rear walls connected by opposed confronting side walls, said walls defining an open top entrance and a bottom dispensing opening, valve means positionable between an open and closed position relative to said hopper bottom opening;
a measuring device located beneath said storage hopper which includes front and rear walls connected to the front and rear walls respectively of said hopper and confronting side walls extending between the front and rear walls of said measuring device, a partition wall disposed intermediate the side walls and front and rear walls of said measuring device, said walls of said measuring device defining a top opening in communication with said bottom dispensing opening and two bottom exit openings on opposite sides of said partition wall;
slide valve means positionable between an open and closed position relative to said two bottom exit openings;
closure means disposed adjacent said slide valve means positionable between an open and closed position relative to one of said two bottom exit openings; and
grinding means disposed opposite said exit openings.

18. A coffee brewing machine which comprises:
first and second cylinders;
a piston located within each of said cylinders;
a brewing chamber means located at one end of said first cylinders, said brewing chamber means including an inlet opening for introducing ground coffee beans into the interior of said brewing chamber means, a water inlet for introducing hot water into the interior of said brewing chamber means, a drain opening located in said brewing chamber means for removing any extracted, ground coffee beans from said brewing chamber means, a coffee beverage outlet for removing the beverage coffee from said brewing chamber means, and a screen separating said coffee beverage outlet from the remainder of said brewing chamber means and said end of said first cylinder; and
mechanical means connecting said pistons within said cylinders so that movement of said piston within said second cylinder causes movement of said piston within said first cylinder.

19. A coffee brewing machine as defined in claim 18 further including heating means located so as to heat the contents of at least one of said cylinders.

20. A coffee brewing machine as defined in claim 18 wherein said mechanical means connecting said pistons is adjustable to vary the distance between said pistons.

21. A coffee brewing machine as defined in claim 20 wherein fluid control valve means is connected to said second cylinder so as to control the movement of water into said second cylinder adjacent said piston in said second cylinder so as to move said piston in said second cylinder and thus through said mechanical means move said piston in said first cylinder.

References Cited by the Examiner

UNITED STATES PATENTS

| | | | |
|---|---|---|---|
| 1,063,188 | 6/1913 | Simone | 99—286 |
| 1,308,252 | 7/1919 | Nelson | 222—485 |
| 1,555,463 | 9/1925 | Ely | 241—224 |
| 1,736,460 | 11/1929 | Pistoni | 99—286 |
| 1,896,724 | 2/1933 | Stein | 241—224 |
| 2,013,306 | 9/1935 | Harrington | 222—542 |
| 2,076,881 | 4/1937 | Cunningham | 222—485 |
| 2,317,007 | 4/1943 | Weniger | 222—542 |
| 2,379,841 | 7/1945 | Thomas | 103—47 X |
| 2,868,109 | 1/1959 | Davis | 99—289 |
| 2,907,266 | 10/1959 | Moulden | 99—289 |
| 3,064,553 | 11/1962 | Simjian | 99—289 |

CHARLES A. WILLMUTH, *Primary Examiner.*

JOSEPH D. BEIN, ROBERT E. PULFREY, *Examiners.*